(12) United States Patent
Que et al.

(10) Patent No.: US 11,636,062 B2
(45) Date of Patent: Apr. 25, 2023

(54) DATA PROCESSING METHOD AND DEVICE, AND SERVER

(71) Applicant: HUAWEI TECHNOLOGIES CO., LTD., Shenzhen (CN)

(72) Inventors: Mingjian Que, Hangzhou (CN); Junjie Wang, Hangzhou (CN); Minjun Zhou, Hangzhou (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/165,158

(22) Filed: Feb. 2, 2021

(65) Prior Publication Data

US 2021/0157765 A1 May 27, 2021

Related U.S. Application Data

(63) Continuation of application No. PCT/CN2019/085476, filed on May 5, 2019.

(30) Foreign Application Priority Data

Aug. 7, 2018 (CN) .......................... 201810893287.3

(51) Int. Cl.
*G06F 13/42* (2006.01)
*G06F 9/455* (2018.01)
*G06F 13/28* (2006.01)

(52) U.S. Cl.
CPC ...... *G06F 13/4282* (2013.01); *G06F 9/45558* (2013.01); *G06F 13/28* (2013.01);
(Continued)

(58) Field of Classification Search
None
See application file for complete search history.

(56) References Cited

U.S. PATENT DOCUMENTS 8,239,655 B2   8/2012  Goggin et al.
9,842,075 B1*  12/2017  Davis .................. G06F 13/4295
(Continued)

FOREIGN PATENT DOCUMENTS

CN   101645832 A   2/2010
CN   102650976 A   8/2012
(Continued)

OTHER PUBLICATIONS

Intel "PCI-SIG SR-IOV Primer, An Introduction to SR-IOV Technology." Intel LAN Access Division. Jan. 1, 2011. XP055573248. Retrieved from the Internet on Mar. 22, 2019. URL: https://www.intel.sg/content/dam/doc/application-note/pci-sig-sriov-primer-sr-iov-technology-paper.pdf. Total 28 pages.
(Continued)

*Primary Examiner* — Henry Tsai
*Assistant Examiner* — Christopher A Bartels
(74) *Attorney, Agent, or Firm* — Maier & Maier, PLLC

(57) ABSTRACT

A data processing method, including: obtaining, by a device in a server, a first I/O request sent by a virtual machine, where the device is connected to the server through a PCIe bus, the virtual machine runs on the server, the device provides a plurality of VFs for the server, the first I/O request is initiated by the virtual machine for any one VF of the plurality of VFs, the first I/O request includes a read operation or a write operation, the read operation is used to perform a data read operation on an I/O device in the server, the write operation is used to perform a data write operation on the I/O device in the server; and reading or writing, by the device, data from or into the I/O device in the server based on the first I/O request.

11 Claims, 2 Drawing Sheets

(52) U.S. Cl.
CPC ............. *G06F 2009/45579* (2013.01); *G06F 2213/0026* (2013.01)

(56) References Cited

U.S. PATENT DOCUMENTS

| | | | | |
|---|---|---|---|---|
| 2007/0067435 | A1* | 3/2007 | Landis | G06F 9/4555 709/224 |
| 2010/0131680 | A1* | 5/2010 | Go | G06F 13/28 710/26 |
| 2010/0306420 | A1* | 12/2010 | Johnson | G06F 13/28 710/22 |
| 2011/0231685 | A1* | 9/2011 | Huang | G06F 1/3253 710/14 |
| 2012/0303887 | A1* | 11/2012 | Radu | G06F 12/0875 711/E12.019 |
| 2013/0159726 | A1* | 6/2013 | Mckeen | G06F 21/53 713/189 |
| 2014/0006660 | A1* | 1/2014 | Frei | H04L 12/281 710/104 |
| 2015/0281126 | A1* | 10/2015 | Regula | G06F 13/4022 709/212 |
| 2016/0154756 | A1* | 6/2016 | Dodson | G06F 13/4022 710/316 |
| 2016/0170789 | A1 | 6/2016 | Anand et al. | |
| 2017/0177854 | A1* | 6/2017 | Gligor | G06F 21/572 |
| 2017/0235562 | A1* | 8/2017 | Bafna | G06F 21/78 718/1 |
| 2018/0136851 | A1* | 5/2018 | Batra | G06F 3/0685 |
| 2019/0227714 | A1* | 7/2019 | Duncan | G06F 3/0659 |
| 2019/0347125 | A1* | 11/2019 | Sankaran | G06F 9/3001 |
| 2019/0385057 | A1* | 12/2019 | Litichever | H04L 63/14 |
| 2020/0183876 | A1* | 6/2020 | Das Sharma | G06F 13/4072 |
| 2021/0034526 | A1* | 2/2021 | Pope | G06F 13/128 |
| 2021/0042263 | A1* | 2/2021 | Zdornov | G06F 11/1451 |
| 2021/0381849 | A1* | 12/2021 | Aviel | H04N 7/18 |
| 2022/0027379 | A1* | 1/2022 | Unterbrunner | G06F 16/254 |
| 2022/0228882 | A1* | 7/2022 | Goldman | G01C 21/005 |

FOREIGN PATENT DOCUMENTS

| | | |
|---|---|---|
| CN | 106897106 A | 6/2017 |
| CN | 107005495 A | 8/2017 |
| CN | 107463829 A | 12/2017 |
| CN | 107807843 A | 3/2018 |
| CN | 107894913 A | 4/2018 |

OTHER PUBLICATIONS

WEIXIN_30648587, "Introduction to virtio", published May 30, 2017 at https://blog.csdn.net/weixin_30648587/article/details/97891832, total 14 pages with an English machine translation.

Yuyan Liu, "Optimizing Network Performance of Para-Virtualization Virtio Framework",Taiyuan University of Technology, Jun. 2017, total 71 pages with an English abstract.

* cited by examiner

201 A device of a server obtains a first input/output request sent by a virtual machine, where the device is connected to the server through a high-speed serial computer expansion standard PCIe bus, the virtual machine runs on the server, the device provides a plurality of virtual functions VFs for the server, the first input/output request is initiated by the virtual machine for any one VF of the plurality of VFs 202 The device reads or writes data from or into the input/output device of the server based on the first input/output request

FIG. 3

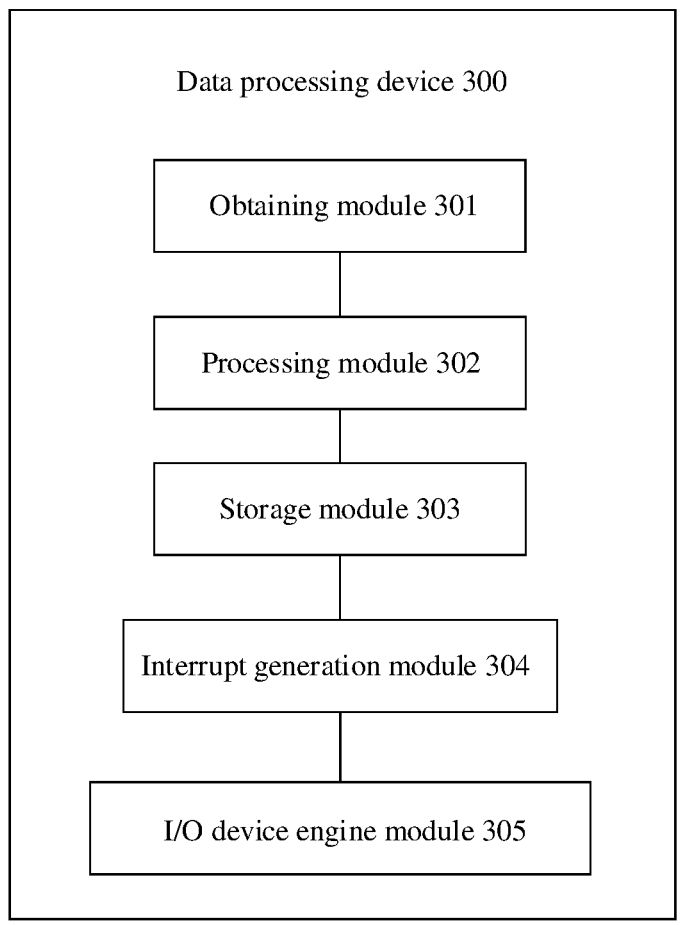

DATA PROCESSING METHOD AND DEVICE, AND SERVER

CROSS-REFERENCE TO RELATED APPLICATIONS

This is a continuation of International Patent Application No. PCT/CN2019/085476, filed on May 5, 2019, which claims priority to Chinese Patent Application No. 201810893287.3, filed on Aug. 7, 2018. The disclosures of the aforementioned applications are hereby incorporated by reference in their entireties.

TECHNICAL FIELD

The embodiments relate to the server field, and more specifically, to a data processing method and device, and a server.

BACKGROUND

In a virtualization scenario, a virtual input/output device (Virtio) on a virtual machine may be implemented in the following manner:

In a full virtualization manner, a virtual machine monitor (VMM) simulates the Virtio, intercepts an input/output (I/O) request initiated by the virtual machine, and simulates real hardware through software. The VMM needs to process all I/O requests initiated by the virtual machine and serialize all the I/O requests into a single I/O flow that can be processed by underlying hardware.

When the Virtio on the virtual machine initiates the I/O request, operations related to a context switch, such as a switch between a kernel mode and a user mode, frequently occur between the virtual machine and a server on which the virtual machine is located. As a result, I/O performance is greatly affected.

In addition, when the VMM simulates a plurality of Virtios, overheads of a central processing unit (CPU) in the server on which the virtual machine is located increase, and performance deteriorates.

SUMMARY

The embodiments provide a data processing method to optimize an input/output (I/O) path and improve virtual I/O performance.

According to a first aspect, a data processing method is provided. The method includes: obtaining, by a device in a server, a first I/O request sent by a virtual machine, where the device is connected to the server through a high-speed serial computer expansion standard peripheral component interconnect express (PCIe) bus, the virtual machine runs on the server, the device provides a plurality of virtual functions (VFs) for the server, the first I/O request is initiated by the virtual machine for any one VF of the plurality of VFs, the first I/O request includes a read operation or a write operation, the read operation is used to perform a data read operation on an I/O device in the server, the write operation is used to perform a data write operation on the I/O device in the server, and the VF is used to manage storage space of the virtual machine; and reading or writing, by the device, data from or into the I/O device in the server based on the first I/O request.

In the embodiments, an I/O service processed by a processor of the server is offloaded to the device. The device completes an I/O processing process. The device is presented as a virtual input/output controller to the server. The device provides an I/O resource for the virtual machine to use. The virtual machine directly sends the I/O request to the device, and the device processes the I/O request. The data processing method in the embodiments can optimize the I/O processing process and reduce load of the processor of the server. The device directly processes the I/O request from the virtual machine, and this further improves virtual I/O performance.

In a possible implementation, the obtaining, by the device, of a first I/O request sent by the virtual machine includes: obtaining, by the device, a first descriptor from a first queue, where the first descriptor is generated after a front-end driver in the virtual machine processes the first I/O request, the first descriptor is used to indicate a storage location of the first I/O request in a memory of the server, the first queue is stored in the memory of the server, and the first queue is used to store descriptors of a plurality of I/O requests including the first I/O request; and obtaining, by the device, the first I/O request from the memory of the server based on the first descriptor.

In another possible implementation, the device includes a descriptor prefetch engine, a direct memory access (DMA) engine, and a memory, and the obtaining, by the device, to a first descriptor from storage space allocated by the server to a first queue includes: generating, by the descriptor prefetch engine, a second descriptor, and sending the second descriptor to the DMA engine, where the second descriptor is used to indicate a storage location of the first descriptor in the storage space allocated by the server to the first queue; and obtaining, by the DMA engine in a DMA manner, based on the second descriptor, the first descriptor from the storage space allocated to the first queue, and storing the first descriptor in the memory of the device.

The descriptor prefetch engine automatically obtains a descriptor from the server. When the virtual machine on the server initiates the I/O request and the front-end driver notifies the device that there is a new descriptor available on the server, the descriptor prefetch engine automatically transfers the descriptor from the server to a local memory of the device. This increases an I/O request processing speed.

In another possible implementation, the device includes an interrupt generation module and a back-end driver, and the obtaining, by the device, of the first I/O request from the memory of the server based on the first descriptor includes: processing, by the back-end driver, an interrupt request initiated by the interrupt generation module, to obtain the first descriptor from the memory, and sending the first descriptor to the DMA engine; and obtaining, by the DMA engine, the first I/O request from the memory of the server in the DMA manner based on the first descriptor.

In another possible implementation, the device further includes an I/O device engine, and the reading or writing, by the device, of data from or into the I/O device in the server based on the first I/O request includes: when the first I/O request is the read operation, generating, by the back-end driver, a data read packet based on the first I/O request, where the data read packet is used to indicate a storage location of to-be-read target data in the I/O device, and the data read packet is further used to indicate a storage location of the read target data in the memory of the device; sending, by the back-end driver, the data read packet to the I/O device through the I/O device engine; and notifying, by the back-end driver, the DMA engine to store the target data stored in the memory of the device in the memory of the server.

In another possible implementation, the reading or writing, by the device, of data from or into the I/O device in the server based on the first I/O request includes: when the first I/O request is the write operation, obtaining, by the DMA engine, from the memory of the server, target data to be written into the I/O device, and writing the target data into the memory of the device; generating, by the back-end driver, a data write packet based on the first I/O request, where the data write packet is used to indicate a storage location of the target data in the memory, and the data write packet is further used to indicate to store the target data in a storage location of the I/O device; and sending, by the back-end driver, the data write packet to the I/O device.

In another possible implementation, the method further includes: after the first I/O request is processed, sending, by the back-end driver, the interrupt request to the server through the DMA engine, where the interrupt request is used by the server to determine a processing result of the first I/O request by the device.

According to a second aspect, a data processing device is provided. The data processing device is configured in a server. The device is connected to the server through a PCIe bus. The data processing device is configured to perform the method in any one of the first aspect or the possible implementations of the first aspect.

According to a third aspect, a server is provided. The server is configured with the data processing device provided in the second aspect. The device is connected to the server through a PCIe bus.

According to a fourth aspect, a computer-readable storage medium is provided. The computer-readable storage medium stores an instruction. When the instruction is run on a computer, the computer is enabled to perform the method according to any one of the first aspect or the possible implementations of the first aspect.

According to a fifth aspect, a computer program product including an instruction is provided. When the instruction is run on a computer, the computer is enabled to perform the method according to any one of the first aspect or the possible implementations of the first aspect.

BRIEF DESCRIPTION OF DRAWINGS

FIG. 3 is a schematic flowchart of a data processing method according to an embodiment; and FIG. 4 is another schematic block diagram of a data processing device according to an embodiment.

DETAILED DESCRIPTION OF THE EMBODIMENTS

The following describes solutions in various embodiments with reference to accompanying drawings.

Figure 1:
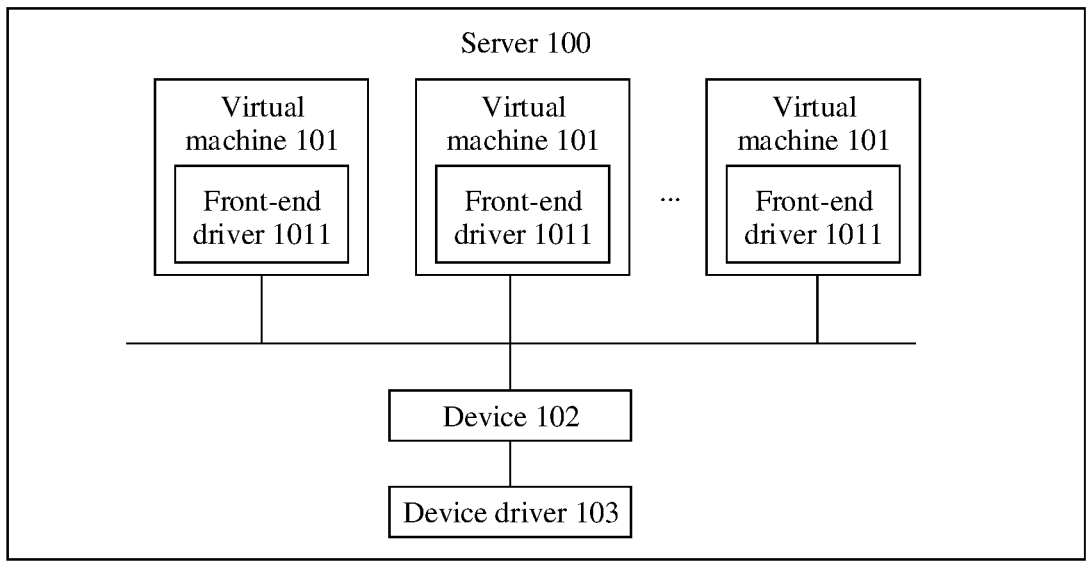
FIG. 1 is a schematic block diagram of a virtual machine system according to an embodiment.

FIG. 1 is a schematic block diagram of a server 100 according to an embodiment. At least one virtual machine 101 runs on the server 100. A front-end driver 1011 is configured for each virtual machine 101. In addition, a data processing device 102 is further configured for the server 100. The device 102 communicates with the server 100 through a high-speed serial computer expansion standard or peripheral component interconnect express (PCIe) bus. The data processing device 102 is configured to process an input/output (I/O) request from the virtual machine. The I/O request includes a read operation or a write operation.

It can be noted that the device 102 in this embodiment may support communication with a front-end driver developed based on a virtual input/output (Virtio) protocol. In other words, the front-end driver 1011 in this embodiment may be developed based on the Virtio protocol. The front-end driver developed based on the Virtio protocol has strong availability and does not need to change with a kernel version of the server 100. Therefore, maintenance costs are reduced.

During an implementation, the device 102 may be a system-on-a-chip (SoC). The SoC may be an independent PCIe card. The PCIe card may be deployed on the server 100 or may be directly integrated with a mainboard of the server 100.

Figure 2:
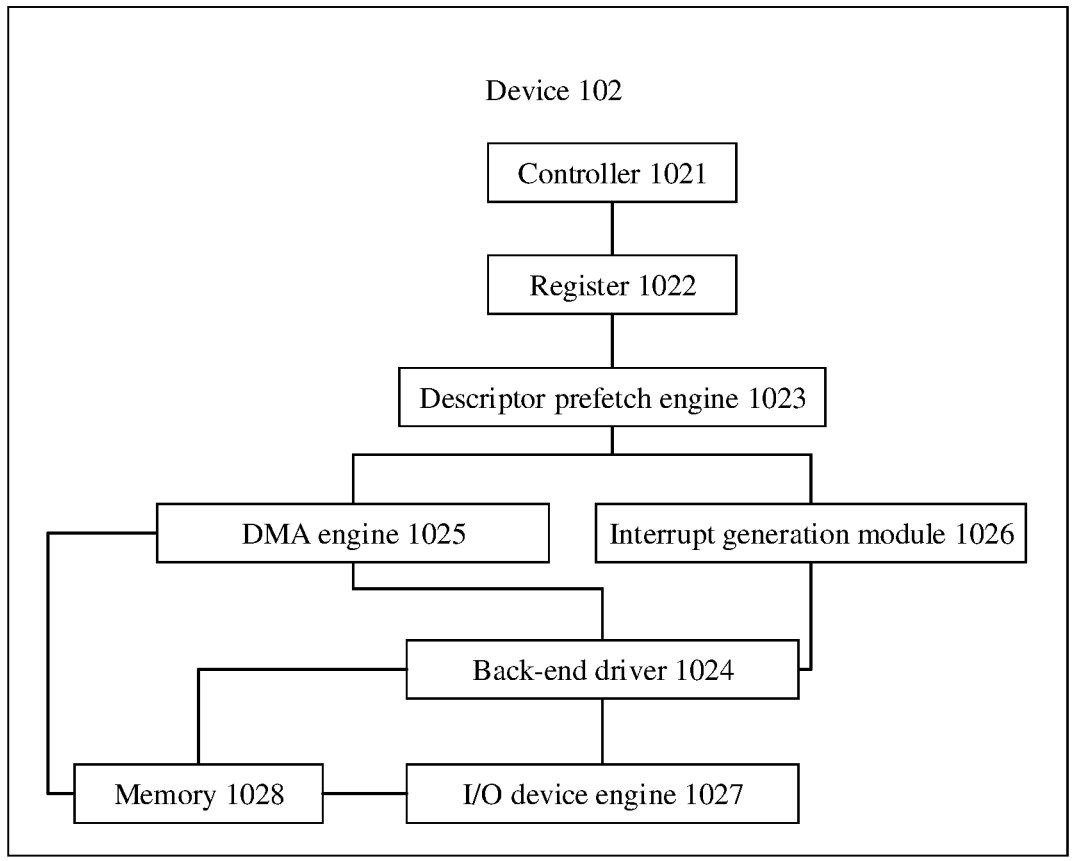
FIG. 2 is a schematic block diagram of a data processing device according to an embodiment.

The following briefly describes the data processing device 102 provided in this embodiment with reference to FIG. 2.

As shown in FIG. 2, the device 102 includes a controller 1021, a register 1022, a descriptor prefetch engine 1023, a back-end driver 1024, a direct memory access (DMA) engine 1025, an interrupt generation module 1026, an I/O device engine 1027, and a memory 1028.

In this embodiment, the device 102 may virtualize, in a hardware virtualization (for example, single root input/output virtualization (SR-IOV) manner, one physical function (PF) of an I/O device connected to the device 102 through the I/O device engine 1027. In this manner, the device 102 presents a plurality of virtual functions (VFs, or VF as singular) to the server 100. Any two VFs are isolated from each other. The plurality of VFs are allocated to a plurality of virtual machines for use. One or more VFs may be allocated to each virtual machine.

For example, the I/O device connected to the device 102 through the I/O device engine 1027 is a storage device, the device 102 presents 256 VFs to the server 100, and each VF may manage one piece of storage space in the storage device. In this case, the 256 VFs are equivalent to 256 storage controllers for the virtual machine, and the 256 VFs can use a total of 1024 queues.

For example, the storage device may be a solid-state drive (SSD). For details about the queue, refer to the following description.

It can be noted that the device 102 in this embodiment may further be connected to a network device (for example, a PCIe Switch) through the I/O device engine 1027. For example, the device 102 presents 100 VFs to the server 100. In this case, the 100 VFs are equivalent to 100 network controllers for the virtual machine.

In addition, the server 100 further includes a device driver 103. A processor (not shown in FIG. 1) of the server 100 executes an instruction in the device driver 103, to configure a working mode of the device 102. Configuring the working mode of the device 102 indicates configuring a quantity of available VFs in the plurality of VFs presented by the device 102 to the server 100 and a quantity of queues allocated to each VF.

If the device 102 needs to be used in the server 100, the processor of the server 100 needs to execute the instruction in the device driver 103, to configure the working mode of the device 103. For example, the processor of the server 100 executes the instruction in the device driver 103 to configure that 50 VFs in the 256 VFs are available to the virtual machine and configure that each VF may use four queues.

Each VF corresponds to a plurality of data structures. The device 102 divides a plurality of pieces of storage space in memory space of the device 102. Each piece of storage space is used to store a data structure. The plurality of pieces of storage space may belong to one piece of base address register (BAR) space, or each piece of storage space may be used as one piece of BAR space. Each piece of BAR space is allocated with an index number. For example, the device 102 stores both a common configuration capability data structure and a notification capability data structure in BAR space whose index number is 1.

The register 1022 is configuration space of the device 102. The configuration space is divided into a plurality of pieces of configuration subspace. Each piece of configuration subspace is used as configuration space of one VF and is allocated to the VF for use. The configuration space of each VF stores a device ID, a vendor I, a plurality of base address fields, a BAR space index number field, a plurality of offset fields, and a plurality of storage length fields.

When storing a data structure in BAR space allocated to the data structure, the device 102 writes into a corresponding offset field, an offset of a start address of storage space occupied by the data structure in the BAR space relative to a start address of the BAR space, and writes into a corresponding storage length field, a length of the storage space occupied by the data structure in the BAR space. For example, the device 102 stores the common configuration capability data structure in a BAR space whose index number is 1, an offset of a start address of storage space occupied by the data structure in the BAR space whose index number is 1 relative to a start address of the BAR space is 10 bytes, and a storage length of the data structure in the BAR space is 100 bytes. The device 102 stores the notification capability data structure in the BAR space whose index number is 1, an offset of a start address of storage space occupied by the data structure in the BAR space whose index number is 1 relative to the start address of the BAR space is 110 bytes, a storage length of the data structure in the BAR space is 50 bytes. The device 102 separately writes into configuration space of corresponding VFs, the offset, and the storage length in the BAR space whose index number is 1 that correspond to the common configuration capability data structure and the notification capability data structure.

The common configuration capability structure includes a queue quantity (num_queues) field, a queue depth (queue_size) field, and a queue enabling (queue_enable) bit that are allocated to the VF.

It can be noted that each data structure of the VF is specified in the virtual input/output (Virtio) protocol. In other words, that which fields in each data structure of the VF are used to store what content is defined in the Virtio protocol.

It can be understood that, in this embodiment, the controller 1021 may be a CPU, or may be another general purpose processor, an SoC, a digital signal processor (DSP), an application-specific integrated circuit (ASIC), a field programmable gate array (FPGA), another programmable logic device, a discrete gate, a transistor logic device, a discrete hardware component, or the like. The general purpose processor may be a microprocessor, any conventional processor, or the like.

The memory 1028 may include a read-only memory and a random access memory and provide an instruction and data to the processor. The memory 1028 may further include a non-volatile random access memory. For example, the memory may further store information of a device type. The memory may be a volatile memory, or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and used as an external cache. Through an example, but non-limiting, description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink link dynamic random access memory (SLDRAM), and a direct rambus random access memory (DR RAM).

Before the server 100 processes the I/O request from the virtual machine through the device 102, the processor of the server 100 needs to execute the instruction in the device driver 103, and the front-end driver 1011 needs to initialize the device 102. The following describes a process in which the front-end driver 1011 initializes the device 102.

(1) The front-end driver 1011 maps BAR space that stores each data structure and that is in the device 102 to memory space of the server 100.

When the server 100 is powered on, the server 100 divides a plurality of pieces of storage space in the memory space of the server 100 and establishes mapping relationships between the plurality of pieces of storage space and a plurality of pieces of BAR space in the device 102. The server 100 writes into a corresponding base address field, a first address of storage space allocated to each BAR space in the memory space of the server 100. For example, the server 100 writes into a base address field whose index number is 0, a first address of storage space allocated to the BAR space whose index number is 0.

After being loaded, the front-end driver 1011 may detect the device 102 based on the device ID and the vendor ID. When the front-end driver 1011 needs to gain access to a data structure stored in BAR space of a VF in the device 102, the front-end driver 1011 finds, based on an index number of the BAR space stored in configuration space of the VF and through a base address field same as the index number of the BAR space, in the memory space of the server 100, a first address of storage space allocated to the BAR space. Then, the front-end driver 1011 determines, based on an offset field and a storage length field that are stored in the configuration space of the VF, in the storage space allocated to the BAR space, a storage area of the to-be-accessed data structure. Therefore, the front-end driver 1011 gains access to the BAR space in the device 102 by gaining access to the memory of the server 100.

(2) The front-end driver 1011 initiates a reset operation to the device 102.

The front-end driver 1011 first resets the device 102 to ensure that historical information is cleared. In this case, hardware logic in the controller 1021 detects the operation, and resets fields in the common configuration capability data structure and the notification capability data structure.

(3) The front-end driver 1011 obtains a feature of the I/O device.

The Virtio protocol defines a series of feature bits to identify capabilities of a device and a driver. For example, if the I/O device is a network adapter, the feature may be used to identify whether the network adapter supports a check function and an offload function.

The front-end driver 1011 obtains the feature of the I/O device. The device feature (device_feature) is in the common configuration capability data structure. A field length is 4 bytes. After successfully obtaining the device feature of the I/O device, the front-end driver 1011 also has a supported driver feature set. The front-end driver 1011 intersects the device feature obtained from the common configuration capability data structure with the feature of the front-end driver 1011. A feature obtained through the intersection is used as a feature supported by the front-end driver 1011 and is written into a driver feature (driver_feature) field in the common configuration capability data structure, so that the driver feature is used as a feature finally negotiated with the device 102, and is notified to the device 102.

(4) The front-end driver 1011 enables the queues one by one.

The front-end driver 1011 allocates, in the memory space of the server 100, a piece of storage space to each queue of each VF. Each piece of storage space is used to store descriptors corresponding to a plurality of I/O requests initiated by the virtual machine for a corresponding VF, a quantity of to-be-processed I/O requests Avail_idx, an index Avail_entry[i]. index of a first descriptor in the plurality of descriptors of the to-be-processed I/O request, a quantity of processed I/O requests Used_idx, and an index Used_entry [i]. index of a first descriptor in the plurality of descriptors of the processed I/O request, where i is an index number of the I/O requests. For details about the descriptor, refer to the following description.

The common configuration capability data structure stores a first address queue_desc of an area for storing the descriptor in storage space allocated to a queue, a first address queue_avail of an area for storing the quantity of the to-be-processed I/O requests Avail_idx, and a first address queue_used of an area for storing the quantity of the processed I/O requests Used_idx. In addition, the common configuration capability data structure also stores a queue selection (queue_select) field. The queue_select field is set to be the index number of the queue and indicates that each field in the common configuration capability data structure belongs to a queue indicated by the queue_select field.

The front-end driver 1011 sets the queue_select field in the common configuration capability data structure to index numbers of different queues, to separately configure queue-_desc, queue_avail, and queue_used that belong to each queue. After the configuration is completed, the front-end driver 1011 may set a queue enabling (queue_enable) field in the common configuration capability data structure of a queue to 1, to indicate to enable the queue. For example, it indicates that the memory space allocated by the server 100 to the queue can be used.

In addition, the front-end driver 1011 also registers an MSI-X interrupt for each queue in the server 100 based on a quantity of MSI-X interrupts supported by the I/O device.

The following briefly describes the descriptor.

In this embodiment, the I/O request sent by the virtual machine for each VF is first obtained by the front-end driver 1011. The front-end driver 1011 encapsulates the I/O request into the descriptor and stores the descriptor in storage space allocated to the queue of the corresponding VF.

The descriptor is used to describe the I/O request. A structure of the descriptor may be an address+a length+a flag+next, where next is used to describe an index number of a next descriptor logically adjacent to the descriptor. A size of each descriptor is 16 bytes. For example, one I/O request is divided into eight segments, and each segment includes 100 bytes. The eight segments correspond to eight descriptors. Each descriptor is used to indicate an address of one segment stored in the memory of the server 100, a stored length, a read/write flag of the segment, and an index number of a next descriptor logically adjacent to the descriptor.

In addition to the plurality of descriptors corresponding to the I/O request, the storage space allocated to the queue also stores the quantity of the to-be-processed I/O requests Avail_idx initiated by the virtual machine and the index number Avail_entry[i]. index of the first descriptor in the plurality of descriptors of the I/O request, where i represents the index number of the request. The quantity of the to-be-processed I/O requests Avail_idx is adjacent to the index number Avail_entry[i]. index of the first descriptor in the plurality of descriptors of the I/O request in the storage space. The quantity of the to-be-processed I/O requests Avail_idx increases with increase of the quantity of I/O requests initiated by the virtual machine.

For example, the index number i of the to-be-processed I/O request is 1, and the I/O request is in a queue whose index number is 2. The device 102 may first find, based on queue_avail stored in the common configuration capability data structure of the queue whose index number is 2, an index number Avail_entry[1]. index of a first descriptor of the I/O request in storage space allocated by the server 100 to the queue. The device 102 finds the first descriptor of the I/O request in the storage space based on queue_desc stored in the common configuration capability data structure and the index number Avail_entry[1]. index of the first descriptor of the I/O request. Then, the device 102 obtains, another descriptor belonging to the I/O request based on a next field in the first descriptor of the I/O request and processes the I/O request based on a plurality of obtained descriptors. For an example process in which the device 102 processes the I/O request, refer to the following description.

With reference to the virtual machine system 100 in FIG. 1 and the device 102 in FIG. 2, the following describes, through an example in which the I/O device is the storage device, a data processing method 200 provided in an embodiment. FIG. 3 is a schematic flowchart of the method 200. The method includes at least the following steps.

201: A device in the server 100 obtains a first input/output I/O request sent by the virtual machine, where the device is connected to the server 100 through the PCIe bus, the virtual machine runs on the server 100, the device provides a plurality of virtual functions VFs for the server 100, the first I/O request is initiated by the virtual machine for any one VF of the plurality of VFs, the first I/O request includes a read operation or a write operation, the read operation is used to perform a data read operation on an I/O device in the server 100, and the write operation is used to perform a data write operation on the I/O device in the server 100.

Thus, the virtual machine running on the server 100 may initiate an I/O request (for example, the first I/O request) for a VF provided by the device 102. The I/O request may be the read operation or the write operation. The read operation is used to perform the data read operation on the I/O device in the server 100. The write operation is used to perform the data write operation on the I/O device in the server 100.

202: The device reads or writes data from or into the I/O device in the server 100 based on the first I/O request.

For example, the device 102 first obtains the I/O request from the virtual machine. If the I/O request is the read operation, the device 102 performs the data read operation on the I/O device in the server 100 based on the I/O request. Alternatively, if the I/O request is the write operation, the device 102 performs the data write operation on the I/O device in the server 100 based on the I/O request.

Optionally, that the device obtains the first I/O request sent by the virtual machine includes that the device obtains a first descriptor from a first queue, where the first descriptor is generated after the front-end driver processes the first I/O request, the first descriptor is used to indicate a storage location of the first I/O request in a memory of the server 100, the first queue is stored in the memory of the server 100, and the first queue is used to store descriptors of a plurality of I/O requests including the first I/O request; and the device obtains the first I/O request from the memory of the server 100 based on the first descriptor.

For example, after the virtual machine sends the I/O request, the I/O request is first obtained by the front-end driver 1011. The front-end driver 1011 encapsulates the I/O request into a plurality of descriptors (for example, the first descriptors).

The front-end driver 1011 determines, based on a destination address of read data or a destination address of write data carried in the I/O request, the destination address belongs to which storage space of the I/O device. The front-end driver 1011 further determines a VF (namely, a VF that manages the storage space) corresponding to the storage space based on the determined storage space and stores the plurality of generated descriptors in storage space allocated by the server 100 to a queue (for example, the first queue) of the VF.

The device 102 obtains the plurality of descriptors of the I/O request from the storage space allocated by the server 100 to the queue and obtains the I/O request from the memory of the server 100 based on the plurality of descriptors.

It can be noted that the storage space allocated by the server 100 to each queue is a part of the storage space in the memory of the server 100.

The following separately describes a method for obtaining, by the device 102, the first descriptor of the first I/O request from the memory of the server 100 and a method for obtaining, by the device 102, the first I/O request from the memory of the server 100 based on the first descriptor.

That the device obtains the first descriptor from storage space allocated by the server 100 to the first queue includes that the descriptor prefetch engine generates a second descriptor, and sends the second descriptor to the DMA engine, where the second descriptor is used to indicate a storage location of the first descriptor in the storage space allocated by the server 100 to the first queue; and the DMA engine obtains the first descriptor from the first queue in a DMA manner based on the second descriptor, and stores the first descriptor in the memory 1028 of the device 102.

For example, after the front-end driver 1011 stores the plurality of descriptors of the I/O request in the storage space allocated by the server 100 to the queue, the front-end driver 1011 performs an operation on a notification capability data structure that belongs to the queue. For example, the front-end driver 1011 writes an index number (for example, the index number is 2) of the queue into a Notify field in the notification capability data structure. Hardware logic in the descriptor prefetch engine 1023 detects the operation, to notify the descriptor prefetch engine 1023 that there is a new descriptor update event in the queue whose index number is 2 in the VF.

The descriptor prefetch engine 1023 views a common configuration capability data structure of the queue whose index number is 2, and obtains, from the queue, a first address queue_desc of an area for storing a descriptor, a first address queue_avail of an area for storing a quantity of to-be-processed I/O requests Avail_idx in the storage space allocated by the server 100 to the queue. The descriptor prefetch engine 1023 further locates in the storage space allocated by the server 100 to the queue, the area for storing the descriptor and the area for storing the quantity of the to-be-processed I/O requests.

For example, the quantity of the to-be-processed I/O requests stored in the storage space of the queue is 10, and the device 102 currently processes an I/O request whose index number is 6. The descriptor prefetch engine 1023 finds, based on an index number Avail_entry[6].index of a first descriptor in a plurality of descriptors of the I/O request whose index number is 6 and a first address queue_desc of an area for storing the descriptor in the storage space, the first descriptor of the I/O request whose index number is 6 in the storage space. Then, the descriptor prefetch engine 1023 finds another descriptor belonging to the I/O request whose index number is 6 in the storage space based on a next field in the first descriptor.

The descriptor prefetch engine 1023 may generate a plurality of DMA transfer descriptors (for example, second descriptors) for the plurality of descriptors of the I/O request whose index is 6 and that are located in the storage space. A structure of the DMA transfer descriptor may be an address+a length. In other words, the descriptor prefetch engine 1023 generates one DMA transfer descriptor for each of the plurality of descriptors. Each DMA transfer descriptor includes a storage location (for example, a start address and an end address) of a corresponding descriptor in the storage space and a storage length.

The descriptor prefetch engine 1023 provides the plurality of generated DMA transfer descriptors to the DMA engine 1025. The DMA engine 1025 obtains the plurality descriptors of the I/O request whose index number is 6 from the storage space in the server 100 and stores the plurality of descriptors in the memory 1028 of the device 102.

The descriptor prefetch engine automatically obtains a descriptor from the server. When the virtual machine on the server initiates the I/O request and the front-end driver notifies the device that there is a new descriptor available on the server, the descriptor prefetch engine automatically transfers the descriptor from the server to a local memory of the device. This increases an I/O request processing speed.

That the device obtains the first I/O request from the memory of the server 100 based on the first descriptor includes that the back-end driver processes an interrupt request initiated by the interrupt generation module, to obtain the first descriptor from the memory, and sends the first descriptor to the DMA engine; and the DMA engine obtains the first I/O request from the memory of the server 100 in the DMA manner based on the first descriptor.

For example, after the DMA engine 1025 stores all the plurality of descriptors of the I/O request whose index number is 6 into the memory 1028, the descriptor prefetch engine 1023 sends the interrupt request to the processor (not shown in FIG. 2) of the device 102 through the interrupt generation module 1026. Because the back-end driver 1024 has registered an interrupt processing callback function with the processor of the device 102 in advance, when processing the interrupt request initiated by the DMA engine 1025, the processor of the device 102 enters processing logic of the back-end driver 1024. In this case, the back-end driver 1024 obtains, from the memory 1028, the plurality of descriptors of the I/O request whose index number is 6, and sends the plurality of descriptors to the DMA engine. The DMA engine obtains, based on the plurality of descriptors from the memory of the server 100, the I/O request whose index number is 6, initiated by the virtual machine.

In this embodiment, an I/O service processed by the processor of the server is offloaded to the device. The device completes an I/O processing process. The device is presented as a virtual input/output controller to the server. The device provides an I/O resource for the virtual machine to use. The virtual machine directly initiates the I/O request to the device. The device processes the I/O request. Compared with a method in which the I/O request initiated by the virtual machine is processed by a VMM, this method can optimize the processing process of the I/O request, and reduce load of the processor of the server. The device directly processes the I/O request from the virtual machine, and this further improves virtual I/O performance.

After obtaining the first I/O request from the memory of the server 100, the device 102 may process the first I/O request based on a type of the first I/O request. For example, when the type of the first I/O request is the read operation, the device 102 performs the data read operation on the I/O device in the server 100. When the type of the first I/O request is the write operation, the device 102 performs the data write operation on the I/O device in the server 100.

The following describes a process in which the device 102 processes the I/O request in different scenarios (for example, a write operation scenario or a read operation scenario).

Scenario 1: The device reads or writes the data from or into the I/O device in the server 100 based on the first I/O request includes: when the first I/O request is the read operation, the back-end driver generates the data read packet based on the first I/O request, where the data read packet is used to indicate the storage location of the to-be-read target data in the I/O device, and the data read packet is further used to indicate the storage location of the read target data in the memory 1028 of the device 102; the back-end driver sends the data read packet to the I/O device through the I/O device engine; and the back-end driver indicates the DMA engine to store the target data stored in the memory 1028 of the device 102 in the memory of the server 100.

For example, when the I/O request is the read operation, the back-end driver 1024 converts the I/O request into the data read packet that conforms to transmission between the device 102 and the I/O device. For example, the I/O device is the network adapter, a format of the data read packet meets a packet format required for network transmission between the device 102 and the network adapter.

The data read packet includes the storage location of the to-be-read target data in the I/O device and the storage location of the read data in the memory 1028. The I/O device reads the target data from a memory of the I/O device based on the data read packet and stores the read target data in the memory 1028 through the I/O device engine 1027.

After storing, in the memory 1028, the target data read from the memory of the I/O device, the I/O device notifies the back-end driver 1024 that the data is stored in the memory 1028. Then the back-end driver 1024 notifies the DMA engine 1025. The DMA engine 1025 obtains the read target data from the memory 1028 and writes the target data into the storage space indicated by the I/O request in the memory of the server 100.

Scenario 2: The device reads or writes the data from or into the I/O device in the server 100 based on the first I/O request includes: when the first I/O request is the write operation, the DMA engine obtains from the memory of the server 100, the target data to be written into the I/O device, and writes the target data into the memory 1028 of the device 102; the back-end driver generates the data write packet based on the first I/O request, where the data write packet is used to indicate the storage location of the target data in the memory, and the data write packet is further used to indicate to store the target data in the storage location of the I/O device; and the back-end driver sends the data write packet to the I/O device.

For example, when the I/O request is the write operation, the back-end driver 1024 first obtains from the server 100, the target data to be written into the I/O device based on the I/O request through the DMA engine 1025. The DMA engine 1025 stores the obtained target data in the memory 1028.

The back-end driver 1024 converts the I/O request into the write data packet that conforms to transmission between the device 102 and the I/O device. The write data packet includes the storage location of the target data stored in the memory 1028. The data write packet further includes the storage location of the data in the I/O device when the target data is written into the I/O device.

The I/O device first obtains, from the memory 1028 through the I/O device engine 1027 based on the write data packet, the to-be-written target data, and writes the target data into the storage space in the I/O device, indicated by the write data packet.

In the scenario 1 and the scenario 2, after the I/O request whose index number is 6 is processed, the back-end driver 1024 reports a processing result of the I/O request to the processor (not shown in FIG. 1) of the server 100.

The method further includes: after the first I/O request is processed, the back-end driver sends the interrupt request to the server 100 through the DMA engine. The interrupt request is used by the server 100 to determine the processing result of the first I/O request by the device.

For example, as mentioned above, the storage space allocated to the queue stores the plurality of descriptors of the to-be-processed I/O request, the quantity of the to-be-processed I/O requests Avail_idx, the index number Avail_entry[i]. index of the first descriptor in the plurality of descriptors of the to-be-processed I/O request, the quantity of the processed I/O requests Used_idx, and the index number Used_entry[i]. index of the first descriptor of the processed I/O request.

After determining that the I/O request whose index number is 6 is processed, the back-end driver 1024 updates a value of Used_idx from 10 to 9 through the DMA engine 1025 and writes an index number of a first descriptor of the I/O request whose index number is 6 to Used_entry[6]. index.

After the back-end driver 1024 processes the I/O request whose index number is 6, the back-end driver 1024 sends the interrupt request to the processor of the server 100 through the DMA engine 1025. The front-end driver 1011 has registered the interrupt processing callback function with the processor of the server 100 in advance. Therefore, when processing the interrupt request initiated by the DMA engine 1025, the processor of the server 100 enters the processing logic of the front-end driver 1011.

The common configuration capability data structure stores the first address queue_used of an area for storing the quantity of the processed I/O requests Used_idx in the queue. In this case, the front-end driver 1011 may view, based on the first address queue_used, Used_entry[i]. index in the storage space allocated in the server 100 to the queue. If there is an index number same as the index number of the first descriptor of the I/O request whose index number is 6, the front-end driver 1011 determines that the device 102 has processed the I/O request whose index number is 6.

In this embodiment, when the front-end driver 1011 performs the write operation on the Notify field in the notification capability data structure of a queue, the local memory has robust space for storing the plurality of descriptors of the I/O request in the queue. In this case, a valid Round-Robin (RR) scheduling request of the queue may be formed.

However, there may be to-be-processed I/O requests in a plurality of queues. In this case, the front-end driver 1011 writes an index number of each queue into a plurality of Notify fields in the plurality of queues. In this case, a plurality of RR scheduling requests are formed.

A round-robin (RR)scheduling method provided in this embodiment is first described when there are I/O requests in the plurality of queues that need to be processed.

For example, when the plurality of RR scheduling requests are processed, the controller 1021 may group the plurality of queues in advance. For example, the plurality of queues are grouped into 32 groups (namely, 32 scheduling groups), and each scheduling group includes scheduling requests of the 32 queues. One scheduling group having a scheduling request is selected from the 32 scheduling groups through first-level RR scheduling. The second-level RR scheduling is then performed for the scheduling group. One queue is selected from the 32 queues in the scheduling group. An RR scheduling request formed by the queue is pre-processed.

When the RR scheduling request formed by the queue is pre-processed, the descriptor prefetch engine 1023 needs to determine whether the queue has a to-be-processed descriptor in the memory space of the server 100 before starting an effective prefetch operation. Only when the queue has the to-be-processed descriptor in the memory space of the server 100, the descriptor prefetch engine 1023 can fetch the to-be-processed descriptor from the server 100. Otherwise, some useless read operations may be initiated to the server 100, and this wastes a bandwidth of a PCIe interface. Therefore, before prefetching the plurality of descriptors of the I/O request from the server 100, the descriptor prefetch engine 1023 needs to determine whether to prefetch the plurality of descriptors of the I/O request from the server 100.

The following describes a method for determining whether to prefetch the plurality of descriptors of the I/O request in the queue from the server 100 according to this embodiment.

In this embodiment, the queue may include the plurality of to-be-processed I/O requests. The common configuration capability data structure stores a quantity of to-be-processed I/O requests in the queue Avail_idx. Two registers are configured for the descriptor prefetch engine 1023, and are configured to record, for each queue, the quantity of the to-be-processed I/O requests vail_idx stored in the storage space of the server 100 and the quantity of I/O requests that have been processed by the device 102 Avail_ring_index-_engine.

The descriptor prefetch engine 1023 obtains, from the two registers based on an index number of the queue, Avail_idx and Avail_ring_index_engine that belong to the queue.

When Avail_idx and Avail_ring_index_engine that belong to the queue are equal, it indicates that the I/O request in the queue has been processed. In this case, the descriptor prefetch engine 1023 does not need to obtain a descriptor from the storage space of the queue.

When Avail_idx and Avail_ring_index_engine that belong to the queue are different, it indicates that an unprocessed I/O request exists in the queue. In this case, the descriptor prefetch engine 1023 needs to continue to obtain a descriptor from storage space of the queue and process the obtained I/O request.

The foregoing describes the data processing method provided in the embodiments with reference to FIG. 1 to FIG. 3. The following describes a data processing device provided in an embodiment with reference to FIG. 4.

FIG. 4 is a schematic block diagram of the data processing device 300 according to this embodiment. The device 300 is configured in a server 100 and is connected to the server 100 through a PCIe bus. The device 300 includes an obtaining module 301, a processing module 302, a storage module 303, an interrupt generation module 304, and an I/O device engine module 305.

The obtaining module 301 is configured to obtain a first input/output I/O request sent by a virtual machine. The first I/O request is initiated by the virtual machine for any one VF of the plurality of VFs. The first I/O request includes a read operation or a write operation. The read operation is used to perform a data read operation on an I/O device in the server. The write operation is used to perform a data write operation on the I/O device in the server. The VF is used to manage storage space of the virtual machine.

The processing module 302 is configured to read or write data from or into the I/O device in the server based on the first I/O request.

Optionally, the obtaining module 301 is further configured to obtain a first descriptor from the first queue. The first descriptor is generated after a front-end driver in the virtual machine processes the first I/O request. The first descriptor is used to indicate a storage location of the first I/O request in a memory of the server. The first queue is stored in the memory of the server. The first queue is used to store descriptors of a plurality of I/O requests including the first I/O request.

The obtaining module 301 is further configured to obtain the first I/O request from the memory of the server based on the first descriptor.

Optionally, the device 300 further includes the storage module 303. The processing module 302 is further configured to generate a second descriptor and send the second descriptor to the obtaining module 301. The second descriptor is used to indicate a storage location of the first descriptor in the storage space allocated by the server to the first queue.

The obtaining module 301 is further configured to obtain, in a DMA manner based on the second descriptor, the first descriptor from the storage space allocated to the first queue and store the first descriptor in the storage module 303 of the device.

Optionally, the device 300 further includes the interrupt generation module 304. The processing module 302 is configured to process an interrupt request initiated by the interrupt generation module 304 to obtain the first descriptor from the storage module 303 and send the first descriptor to the obtaining module 301.

The obtaining module 301 is further configured to obtain the first I/O request from the memory of the server in the DMA manner based on the first descriptor.

Optionally, the device 300 further includes the I/O device engine module 305. The processing module 302 is further configured to generate a data read packet based on the first I/O request when the first I/O request is the read operation. The data read packet is used to indicate a storage location of to-be-read target data in the I/O device. The data read packet is further used to indicate a storage location of the read target data in the storage module 303.

The processing module 302 is further configured to send the data read packet to the I/O device through the I/O device engine module 305.

The processing module 302 is further configured to notify the obtaining module 301 to store the target data stored in the storage module 303 in the memory of the server.

Optionally, the obtaining module 301 is further configured to when the first I/O request is the write operation, obtain, from the memory of the server, target data to be written into the I/O device, and write the target data into the storage module 303.

The processing module 302 is further configured to generate a data write packet based on the first I/O request. The data write packet is used to indicate a storage location of the target data in the storage module 303. The data write packet is further used to indicate to store the target data in a storage location of the I/O device.

The processing module 302 is further configured to send the data write packet to the I/O device.

Optionally, the processing module 302 is further configured to send the interrupt request to the server after the first I/O request is processed. The interrupt request is used by the server to determine a processing result of the first I/O request by the device.

The device provided in this embodiment can offload an I/O service processed by a processor of the server to the device. The device completes an I/O processing process. The device is presented as a virtual input/output controller to the server. The device provides an I/O resource for the virtual machine to use. The virtual machine directly initiates the I/O request to the device. The device processes the I/O request. Compared with processing the I/O request initiated by the virtual machine by a VMM, processing the I/O request by the device can optimize the processing process of the I/O request, and reduce load of the processor of the server. The device directly processes the I/O request from the virtual machine, and this further improves virtual I/O performance.

It can be understood that the data processing device 300 according to this embodiment may correspond to the device 102 in the embodiments, and may correspond to a corresponding body that performs the method 200 according to the embodiments. In addition, the foregoing and other operations and/or functions of the modules in the data processing device 300 are respectively used to implement corresponding procedures of the method 200 in FIG. 3. For brevity, details are not described herein again.

Another embodiment provides a server. The server includes the data processing device 102 or the data processing device 300. The server is configured to implement operation steps of the data processing method in FIG. 3.

All or some of the foregoing embodiments may be implemented in a form of software, hardware, firmware, or any combination thereof. When software is used to implement the embodiments, all or some of the foregoing embodiments may be implemented in a form of a computer program product. The computer program product includes one or more computer instructions. When the computer program instructions are loaded or executed on a computer, the procedure or functions according to the embodiments are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

The foregoing content is merely an implementation of the embodiments, but is not intended to limit the protection scope of the embodiments. Any variation or replacement readily figured out by a person of ordinary skill in the art within the technical scope in the embodiments shall fall within the protection scope.

What is claimed is:

1. A data processing method, comprising:
obtaining, by a device in a server, a first input/output (I/O) request sent by a virtual machine, wherein the device is connected to the server through a peripheral component interconnect express (PCIe) bus, the virtual machine runs on the server, the device provides a plurality of virtual functions (VFs) for the server, the first I/O request is initiated by the virtual machine for any one VF of the plurality of VFs, and the VF is used to manage storage space of the virtual machine; and
reading or writing, by the device, data from or into the I/O device in the server based on the first I/O request;
wherein the obtaining, by a device in a server, a first I/O request sent by the virtual machine comprises:
obtaining, by the device, a first descriptor from a first queue, wherein the first descriptor is generated after a front-end driver in the virtual machine processes the first I/O request, the first descriptor is used to indicate a storage location of the first I/O request in a memory of the server, the first queue is stored in the memory of the server, and the first queue is used to store descriptors of a plurality of I/O requests comprising the first I/O request; and
obtaining, by the device, the first I/O request from the memory of the server based on the first descriptor;
wherein the device comprises a descriptor prefetch engine, a direct memory access (DMA) engine, and a memory, and the obtaining, by the device, of the first descriptor from storage space allocated by the server to a first queue comprises:
generating, by the descriptor prefetch engine, a second descriptor, and sending the second descriptor to the DMA engine, wherein the second descriptor is used to indicate a storage location of the first descriptor in the storage space allocated by the server to the first queue; and
obtaining, by the DMA engine, the first descriptor from the first queue in a DMA manner based on the second descriptor, and storing the first descriptor in the memory of the device.

2. The method of claim 1, wherein the device comprises an interrupt generation module and a back-end driver, and the obtaining, by the device, of the first I/O request from the memory of the server based on the first descriptor comprises:
processing, by the back-end driver, an interrupt request initiated by the interrupt generation module, to obtain the first descriptor from the memory, and sending the first descriptor to the DMA engine; and obtaining, by the DMA engine, the first I/O request from the memory of the server in the DMA manner based on the first descriptor.

3. The method of claim 2, wherein the device further comprises an I/O device engine, and the reading or writing, by the device, of data from or into the I/O device in the server based on the first I/O request comprises:
when the first I/O request is the read operation, generating, by the back-end driver, a data read packet based on the first I/O request, wherein the data read packet is used to indicate a storage location of to-be-read target data in the I/O device, and the data read packet is further used to indicate a storage location of the read target data in the memory of the device;
sending, by the back-end driver, the data read packet to the I/O device through the I/O device engine; and
notifying, by the back-end driver, the DMA engine to store the target data stored in the memory of the device in the memory of the server.

4. The method of claim 1, wherein the reading or writing, by the device, of data from or into the I/O device in the server based on the first I/O request comprises:
when the first I/O request is the write operation, obtaining, by the DMA engine, from the memory of the server, target data to be written into the I/O device, and writing the target data into the memory of the device;
generating, by the back-end driver, a data write packet based on the first I/O request, wherein the data write packet is used to indicate a storage location of the target data in the memory, and the data write packet is further used to indicate to store the target data in a storage location of the I/O device; and
sending, by the back-end driver, the data write packet to the I/O device.

5. The method of claim 1, further comprising:
after the first I/O request is processed, sending, by the back-end driver, the interrupt request to the server through the DMA engine, wherein the interrupt request is used by the server to determine a processing result of the first I/O request by the device.

6. A server, the server comprising a device, the device is connected to the server through a high-speed serial computer expansion standard (PCIe) bus, and the device is configured to perform the following operation steps:
obtaining a first input/output (I/O) request sent by a virtual machine, wherein the device is connected to the server through a PCIe bus, the virtual machine runs on the server, the device provides a plurality of virtual functions (VFs) for the server, the first I/O request is initiated by the virtual machine for any one VF of the plurality of VFs, and the VF is used to manage storage space of the virtual machine; and
reading or writing data from or into the I/O device in the server based on the first I/O request;
obtaining a first descriptor from a first queue, wherein the first descriptor is generated after a front-end driver in the virtual machine processes the first I/O request, the first descriptor is used to indicate a storage location of the first I/O request in a memory of the server, the first queue is stored in the memory of the server, and the first queue is used to store descriptors of a plurality of I/O requests comprising the first I/O request; and
obtaining the first I/O request from the memory of the server based on the first descriptor;
wherein the device comprises a descriptor prefetch engine and a direct memory access (DMA) engine, the descriptor prefetch engine is configured to generate a second descriptor, and send the second descriptor to the DMA engine, wherein the second descriptor is used to indicate a storage location of the first descriptor in the storage space allocated by the server to the first queue; and
the DMA engine is configured to obtain the first descriptor from the first queue in a DMA manner based on the second descriptor, and store the first descriptor in the memory of the device.

7. The server of claim 6, wherein the device comprises an interrupt generation module and a back-end driver;
the back-end driver is configured to process an interrupt request initiated by the interrupt generation module, to obtain the first descriptor from the memory, and send the first descriptor to the DMA engine; and
the DMA engine is further configured to obtain the first I/O request from the memory of the server in the DMA manner based on the first descriptor.

8. The server of claim 6, wherein the device further comprises an I/O device engine;
the I/O device engine is configured to, when the first I/O request is the read operation, generate a data read packet based on the first I/O request, wherein the data read packet is used to indicate a storage location of to-be-read target data in the I/O device, and the data read packet is further used to indicate a storage location of the read target data in the memory of the device; send the data read packet to the I/O device through the I/O device engine; and notify the DMA engine to store the target data stored in the memory of the device in the memory of the server.

9. The server of claim 6, wherein
the DMA engine is further configured to obtain, when the first I/O request is the write operation, from the memory of the server, target data to be written into the I/O device, and write the target data into the memory of the device; and
the back-end driver is configured to generate a data write packet based on the first I/O request, wherein the data write packet is used to indicate a storage location of the target data in the memory, and the data write packet is further used to indicate to store the target data in a storage location of the I/O device; and send the data write packet to the I/O device.

10. The server of claim 6, wherein the back-end driver is configured to send, after the first I/O request is processed, the interrupt request to the server through the DMA engine, wherein the interrupt request is used by the server to determine a processing result of the first I/O request by the device.

11. A non-transitory computer-readable storage medium comprising instructions which, when executed by a computer, cause the computer to carry out steps for:
obtaining a first input/output (I/O) request sent by a virtual machine, wherein the device is connected to the server through a peripheral component interconnect express (PCIe) bus, the virtual machine runs on the server, the device provides a plurality of virtual functions (VFs) for the server, the first I/O request is initiated by the virtual machine for any one VF of the plurality of VFs, and the VF is used to manage storage space of the virtual machine; and
reading or writing data from or into the I/O device in the server based on the first I/O request;
obtaining a first descriptor from a first queue, wherein the first descriptor is generated after a front-end driver in the virtual machine processes the first I/O request, the first descriptor is used to indicate a storage location of the first I/O request in a memory of the server, the first queue is stored in the memory of the server, and the first queue is used to store descriptors of a plurality of I/O requests comprising the first I/O request; and obtaining the first I/O request from the memory of the server based on the first descriptor;

wherein the device comprises a descriptor prefetch engine and a direct memory access (DMA) engine, the descriptor prefetch engine is configured to generate a second descriptor, and send the second descriptor to the DMA engine, wherein the second descriptor is used to indicate a storage location of the first descriptor in the storage space allocated by the server to the first queue; and the DMA engine is configured to obtain the first descriptor from the first queue in a DMA manner based on the second descriptor, and store the first descriptor in the memory of the device.

* * * * *